Nov. 20, 1928.
E. J. SERPAS
JOINT
Filed Aug. 22, 1925
1,692,708
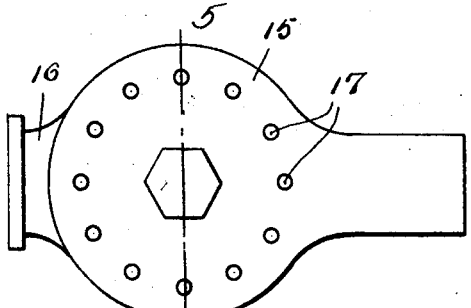
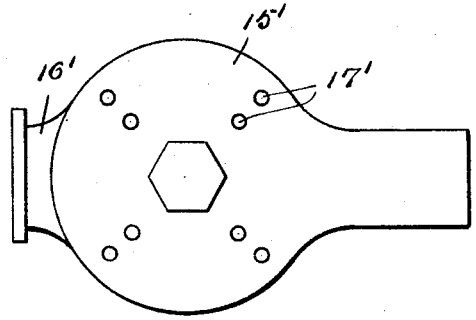
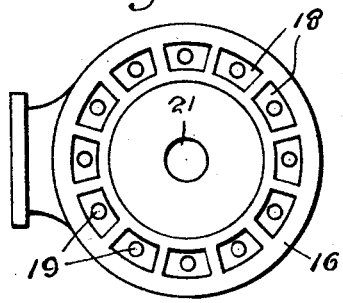
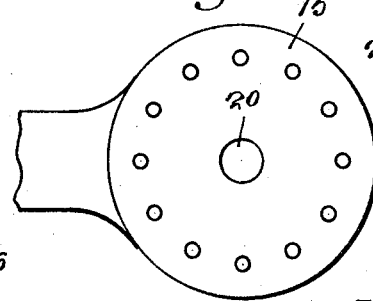
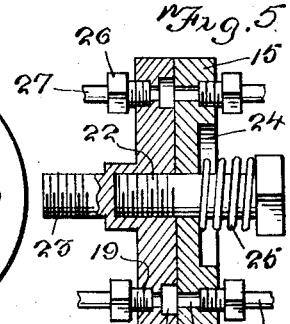
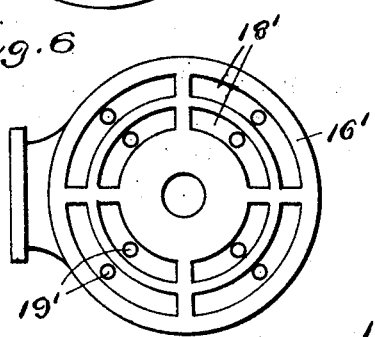
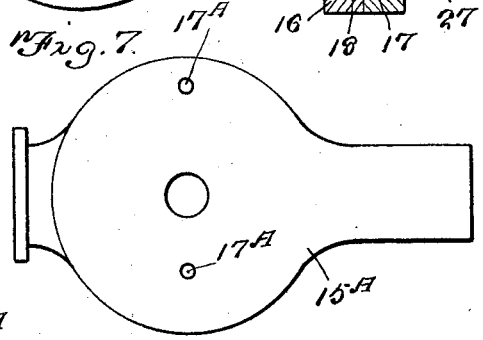
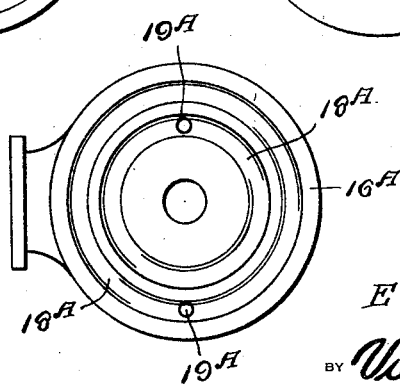
E. J. Serpas
INVENTOR
BY Victor J. Evans
ATTORNEY Patented Nov. 20, 1928.

1,692,708

UNITED STATES PATENT OFFICE.

ERNEST J. SERPAS, OF NEW ORLEANS, LOUISIANA.

JOINT.

Application filed August 22, 1925. Serial No. 51,780.

This invention relates to improvements in lubricating joints and which embodies among other characteristics an arrangement by means of which the joint may rotate and oscillate to facilitate the application of the device upon the different forms of work.

Another object of the invention comprehends means for introducing and discharging lubricants at periodic intervals.

A further object of the invention contemplates recesses carried by the joint and normally closed to prevent back pressure and leakage of lubricant through the joint.

With the above and other objects in view, the invention further includes the following novel features and details of construction, to be hereinafter more fully described, illustrated in the accompanying drawings and pointed out in the appended claim.

In the drawings:—

Figures 1, 3 and 4 are plan views of my novel form of joint.

Figure 5 is a vertical sectional view taken on line 5—5 of Figure 1.

Figures 2 and 6 illustrate a modified form of my invention.

Figures 7 and 8 indicate a separate and third modification of my invention.

In carrying out my invention, referring to Figures 1, 3 and 4 of the drawing, wherein I have illustrated companion plates 15 and 16; the plates 15 having a plurality of openings 17 extending transversely therethrough and arranged in the form of a circle therein and adapted for selective registration with the pressed portion or pocket 18 provided in the corresponding and adjacent face of the plate 16, also including openings 19 arranged centrally of the pocket, each of the plates 15 and 16 respectively having openings 20 and 21 extending transversely and centrally thereof for the reception of a spring pin 22 therein in holding and securing the plates rigidly to a securing nipple or stud 23, the latter being provided for securing the plates 15 and 16 upon an appropriate portion of a motor vehicle chassis or machinery. The plate 15 forming a recess portion 24 upon its outer side for the reception of the spring 25 encircling the pin or bolt 22 while the plate 16 having the shank 23 formed upon its corresponding and opposite side whereby the joint is completed and owing to the association thereof is mounted for any sort of movement or momentum with respect to the axial association. The openings 17 in the plate 15 and pockets 18 provided in the plate 16 being so arranged for relative and selective registration as to permit the openings 17 to register with the pockets 18 at a very slight turn of either the plate 15 upon the plate 16 or vice versa whereby the pockets will register with corresponding openings throughout the movement in either direction of either of the plates.

In Figures 2 and 6 of the drawings, I have illustrated a modified form of my invention which contemplates the provision of companion plates 15' and 16' respectively, the main characteristic and different departure in this form of my invention being the relative arrangement of openings 17' arranged in the plates 15' arranged in superimposed rows and in circumferential alignment for selective engagement and registration with the correspondingly positioned elongated pockets 18' provided in the adjacent face of the plate 16' including openings 19' disposed centrally of the length therein.

In Figures 7 and 8 of the drawings, I have illustrated a third modification of my invention which contemplates the provision of companion plates 15ª and 16ª respectively; the plates 15ª having openings 17ª arranged upon diametrically opposite sides thereof and at various distances from the edges thereof for selective registration with the circumferential grooves 18ª provided in the plate 16ª in superimposed rows and including correspondingly positioned openings 19ª provided therein.

From the foregoing description and accompanying drawings, it is clearly apparent and manifest that the joint thus formed, as clearly illustrated in Figure 5 of the drawings, when used in conjunction with the form of my invention as shown, described and illustrated in Figures 1, 3 and 4 respectively, that when nipples 26 having pipes are secured within the openings and pockets in the plates lubricants may be effectively applied at desired times.

Any distributor having the pipes 27 connected therewith, will periodically register with the apertures in the disk to lubricate other parts of the vehicle chassis when the vehicle encounters ruts or other depressions in roadways.

The invention is susceptible of various changes in its form, proportions and minor details of construction, and the right is herein reserved to make such changes as properly fall within the scope of the appended claim.

Having thus described my invention what I claim is:—

A lubricant coupling joint comprising stationary and movable sections, a stud carried upon the stationary section for anchoring the same upon its work, the inner face of the stationary section being provided with circumferentially disposed recesses having discharge openings at right angles to the face of the stationary member, the movable section lying flush against the recessed face of the stationary section and having openings adapted for selective communication with the openings in the stationary section, a pin passed through the movable section and having connection with the stationary section axially of the stud therefor, and a spring encircling the pin and having its ends in engagement with the pin and the outer surface of the movable section to resiliently seat the latter upon the stationary section to prevent leakage between the sections incident to back pressure of lubricant.

In testimony whereof I affix my signature.

ERNEST J. SERPAS.